US008223375B2

(12) United States Patent
Kido et al.

(10) Patent No.: US 8,223,375 B2
(45) Date of Patent: Jul. 17, 2012

(54) RECEPTION MANAGEMENT APPARATUS, RECEPTION MANAGEMENT METHOD AND COMPUTER PROGRAM PRODUCT

(75) Inventors: Daisuke Kido, Aichi-ken (JP); Hiroki Inoue, Aichi-ken (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 392 days.

(21) Appl. No.: 12/637,185

(22) Filed: Dec. 14, 2009

(65) Prior Publication Data

US 2010/0165389 A1 Jul. 1, 2010

(30) Foreign Application Priority Data

Dec. 26, 2008 (JP) ................................ 2008-333966

(51) Int. Cl.
*G06F 3/12* (2006.01)

(52) U.S. Cl. ......... 358/1.15; 382/190; 358/1.1; 358/1.9; 345/168

(58) Field of Classification Search ................... 358/1.1, 358/1.15; 382/190; 345/168
See application file for complete search history.

(56) References Cited

U.S. PATENT DOCUMENTS

| | | | | |
|---|---|---|---|---|
| 7,377,426 | B1 * | 5/2008 | Makeever | 235/382 |
| 2002/0139845 | A1 | 10/2002 | Terada et al. | |
| 2003/0058082 | A1 * | 3/2003 | Mallick et al. | 340/5.6 |
| 2006/0274945 | A1 * | 12/2006 | Chu et al. | 382/190 |

FOREIGN PATENT DOCUMENTS

| | | | |
|---|---|---|---|
| DE | 44 31 780 | A1 | 3/1996 |
| EP | 0 790 585 | A2 | 8/1997 |
| GB | 2 315 350 | A | 1/1998 |
| JP | 6131507 | | 5/1994 |
| JP | 2003-168077 | A | 6/2003 |

OTHER PUBLICATIONS

The Extended European Search Report in European Patent Application No. 09178746.5 of Jan. 27, 2011.

* cited by examiner

*Primary Examiner* — King Poon
*Assistant Examiner* — Iriana Cruz
(74) *Attorney, Agent, or Firm* — McCarter & English LLP

(57) ABSTRACT

In a reception management apparatus, when a print button is operated after scheduled visitor information is selected, a badge ID representing print number is assigned to the selected scheduled visitor information and thereby print data of an entry pass associated with the scheduled visitor information is created and output to a printer. At the same time, the badge ID is assigned to and displayed in the scheduled visitor information in the appointment list display window. Further, when a shared button is operated after the scheduled visitor information is selected, the badge ID representing print number is assigned to the selected scheduled visitor information and thereby print data of the entry pass associated with the scheduled visitor information is created and output to the printer. At the same time, the personal information corresponding to the scheduled visitor information is stored in the entry-permitted list as entry-permitted visitor information.

9 Claims, 14 Drawing Sheets

RECEPTION MANAGEMENT APPARATUS, RECEPTION MANAGEMENT METHOD AND COMPUTER PROGRAM PRODUCT

CROSS-REFERENCE TO RELATED APPLICATIONS

The present application claims priority from Japanese Patent Application No. 2008-333966, filed on Dec. 26, 2008, the disclosure of which is hereby incorporated by reference in its entirety.

TECHNICAL FIELD

The disclosure relates to a reception management apparatus, a reception management method and a computer program product for managing a visitor's entry into a facility at a reception of the facility.

BACKGROUND

There is a device for issuing a personal identification card that is installed at a reception of a building. Such a device is configured to write a visitor's personal information onto a magnetic recording portion of a paper card and the like, based on pre-entered information or information entered at the reception. Then, the device prints necessary visible information on the surface of such a card and issues as a personal identification card.

SUMMARY

The disclosure has been made to provide a reception management apparatus, a reception management method and a computer program product for assuredly preventing printing of an entry pass at a reception if the entry pass has been already printed.

To achieve the purpose of the disclosure, there is provided a reception management apparatus comprising: a print data output unit that outputs, to a printer, print data of an entry pass which permits entry to a facility; a personal information input device through which personal information for identifying a scheduled visitor to the facility is inputted; an entry appointment storage unit that stores, in an appointment list, the personal information inputted through the personal information input device as scheduled visitor information with respect to the scheduled visitor to the facility; a window display device that displays, in a display screen, an input window which is used in inputting the personal information and an appointment list display window which shows by list the scheduled visitor information stored in the appointment list; a scheduled visitor information select device that is used in selecting one scheduled visitor information from among the scheduled visitor information shown in the appointment list display window; a button arrangement unit that arranges, in the display screen, a print button which is used in inputting a print instruction and a shared button which is used in simultaneously inputting the print instruction and a storage instruction to an entry-permitted list; an input device that is used in carrying out an input operation; a badge ID display control unit that, in a case where the print button is operated using the input device after the scheduled visitor information is selected using the scheduled visitor information select device, assigns a badge ID representing print number to the scheduled visitor information selected using the scheduled visitor information select device to thereby create the print data of the entry pass associated with the scheduled visitor information and output to the printer, and simultaneously displays the badge ID assigned in the scheduled visitor information displayed in the appointment list display window; and a shared button control unit that, in a case where the shared button is operated using the input device after the scheduled visitor information is selected using the scheduled visitor information select device, assigns the badge ID representing print number to the scheduled visitor information selected using the scheduled visitor information select device to thereby create the print data of the entry pass associated with the scheduled visitor information and output to the printer, and simultaneously stores, in the entry-permitted list, the personal information corresponding to the scheduled visitor information as entry-permitted visitor information with respect to an entry-permitted visitor to the facility.

According to another aspect of the disclosure, there is provided a reception management method comprising: a personal information input step of inputting personal information for identifying a scheduled visitor to a facility; an entry appointment storage step of storing, in an appointment list, the personal information inputted in the personal information input step as scheduled visitor information with respect to the scheduled visitor to the facility; a window display step of displaying, in a display screen, an appointment list display window which shows by list the scheduled visitor information stored in the appointment list; a scheduled visitor information select step of selecting one scheduled visitor information from among the scheduled visitor information shown in the appointment list display window in the window display step; a button arrangement step of arranging, in the display screen, a print button which is used in inputting a print instruction and a shared button which is used in simultaneously inputting the print instruction and a storage instruction to an entry-permitted list; a badge ID display control step of, in a case where the print button is operated using an input device that is used in carrying out an input operation after the scheduled visitor information is selected in the scheduled visitor information select step, assigning a badge ID representing print number to the scheduled visitor information selected in the scheduled visitor information select step to thereby create print data of an entry pass associated with the scheduled visitor information and output to the printer, and simultaneously displays the badge ID assigned in the scheduled visitor information displayed in the appointment list display window; and a shared button control step of, in a case where the shared button is operated using the input device after the scheduled visitor information is selected in the scheduled visitor information select step, assigning the badge ID representing print number to the scheduled visitor information selected in the scheduled visitor information select step to thereby create the print data of the entry pass associated with the scheduled visitor information and output to the printer, and simultaneously storing, in the entry-permitted list, the personal information corresponding to the scheduled visitor information as entry-permitted visitor information with respect to an entry-permitted visitor to the facility.

According to yet another object of the disclosure, there is provided a computer program product used and executed by a reception management apparatus comprising: a computer readable recording medium; and a computer program stored in the computer readable recording medium, wherein the computer program includes: a personal information input step of inputting personal information for identifying a scheduled visitor to a facility; an entry appointment storage step of storing, in an appointment list, the personal information inputted in the personal information input step as scheduled visitor information with respect to the scheduled visitor to the facility; a window display step of displaying, in a display screen, an input window which is used in inputting the personal information and an appointment list display window which shows by list the scheduled visitor information stored in the appointment list; a scheduled visitor information select step of selecting one scheduled visitor information from among the scheduled visitor information shown in the appointment list display window in the window display step; a button arrangement step of arranging, in the display screen, a print button which is used in inputting a print instruction and a shared button which is used in simultaneously inputting the print instruction and a storage instruction to an entry-permitted list; a badge ID display control step of, in a case where the print button is operated using an input device that is used in carrying out an input operation after the scheduled visitor information is selected in the scheduled visitor information select step, assigning a badge ID representing print number to the scheduled visitor information selected in the scheduled visitor information select step to thereby create print data of an entry pass associated with the scheduled visitor information and output to the printer, and simultaneously displays the badge ID assigned in the scheduled visitor information displayed in the appointment list display window; and a shared button control step of, in a case where the shared button is operated using the input device after the scheduled visitor information is selected in the scheduled visitor information select step, assigning the badge ID representing print number to the scheduled visitor information selected in the scheduled visitor information select step to thereby create the print data of the entry pass associated with the scheduled visitor information and output to the printer, and simultaneously storing, in the entry-permitted list, the personal information corresponding to the scheduled visitor information as entry-permitted visitor information with respect to an entry-permitted visitor to the facility

DETAILED DESCRIPTION

A detailed description of an exemplary embodiment of a badge printing system embodying the disclosure will now be given referring to the accompanying drawings. The badge printing system is installed at a reception of a facility, such as a factory and a building, and creates a badge to be used as an entry pass for a visitor to the facility.

First, a schematic configuration of a badge printing system 1 according to the present embodiment will be described with reference to FIG. 1.

Figure 1:
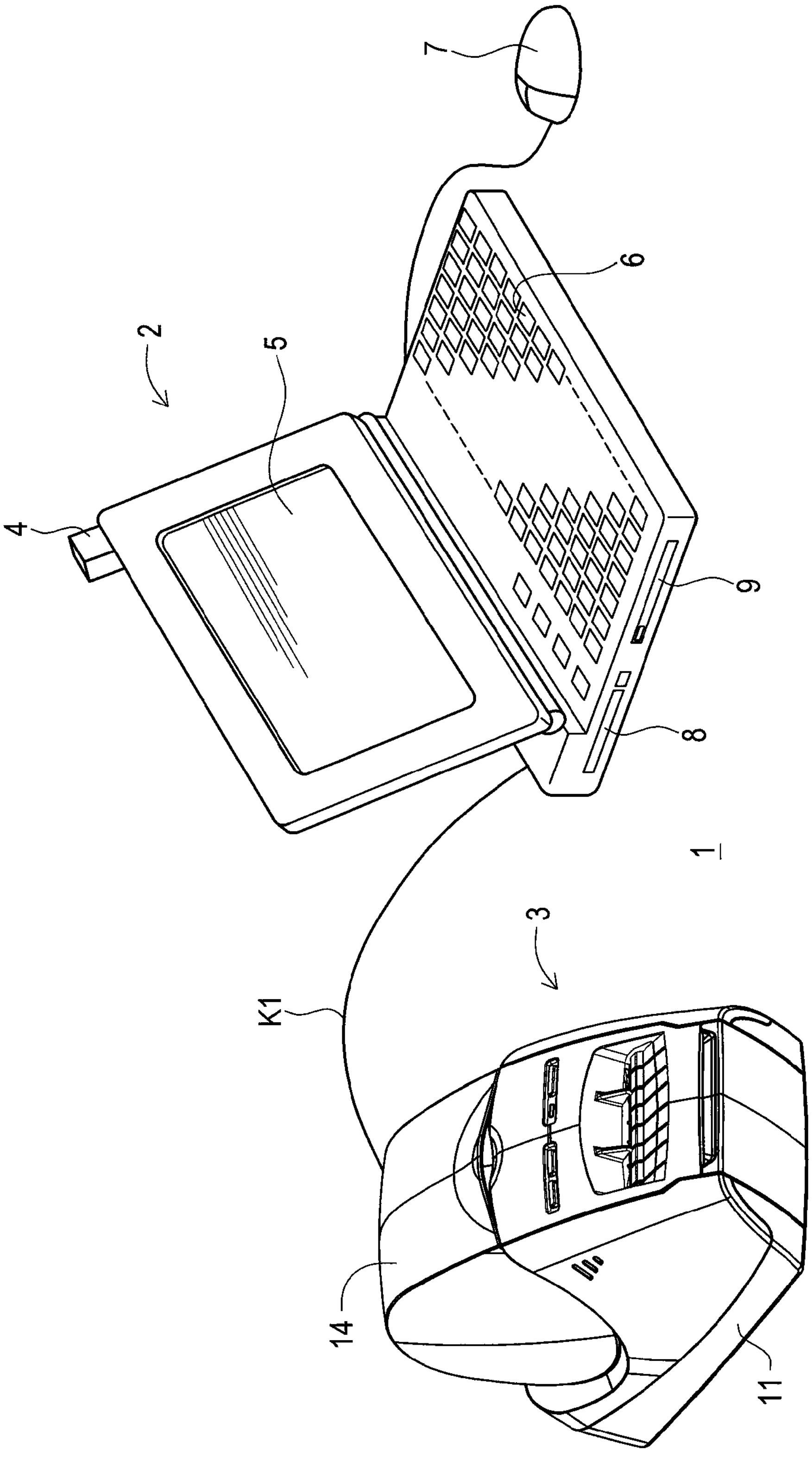
FIG. 1 is a view showing schematic configuration of a badge printing system according to the present embodiment.

As shown in FIG. 1, a badge printing system 1 according to the present embodiment includes a computer 2 given as one example of a reception management apparatus such as a note-book type personal computer, and a tape printer 3 to be connected to the computer 2 through a signal cable K1.

The computer 2 has a CCD camera 4, a display 5 such as a liquid crystal display and an organic EL display, a keyboard 6, a Floppy (trademark) disk drive (FDD) 8 and a CD-R/W 9 in an integrated manner, and a hard disk drive (HDD) 49 (see FIG. 4) built therein. Further, a mouse 7 is connected to the computer 2. It is to be noted that the mouse 7 may be replaced with a joystick, a track ball and the like. The CD-R/W 9 may also be replaced with an MO drive, a DVD drive and the like.

Next, a schematic configuration of a tape printer 3 will be described based on FIG. 2 and FIG. 3.

Figure 2:
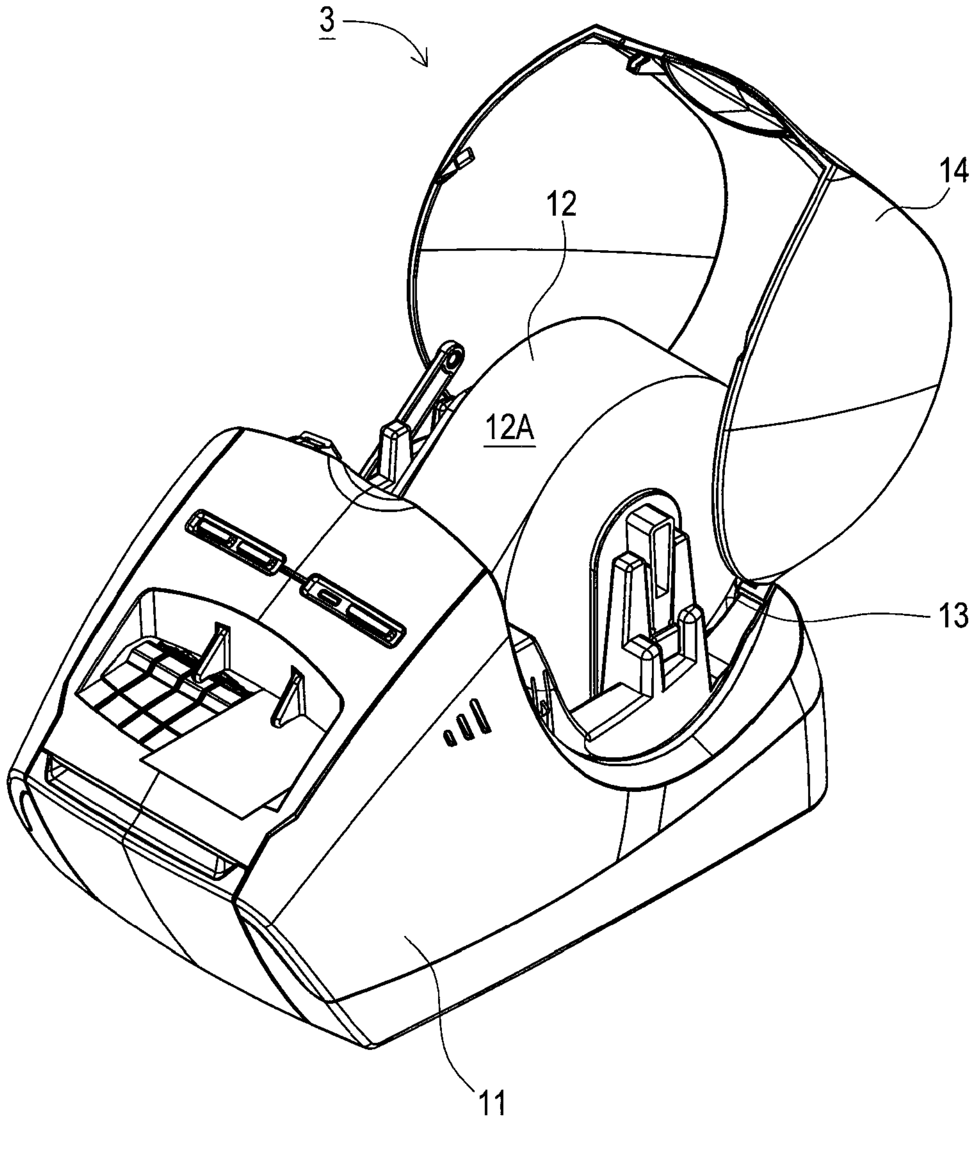
FIG. 2 is a perspective view taken from an upper right side of a tape printer as shown in FIG. 1, with a top cover thereof open, and a rolled sheet holder mounted therein.
Figure 3:
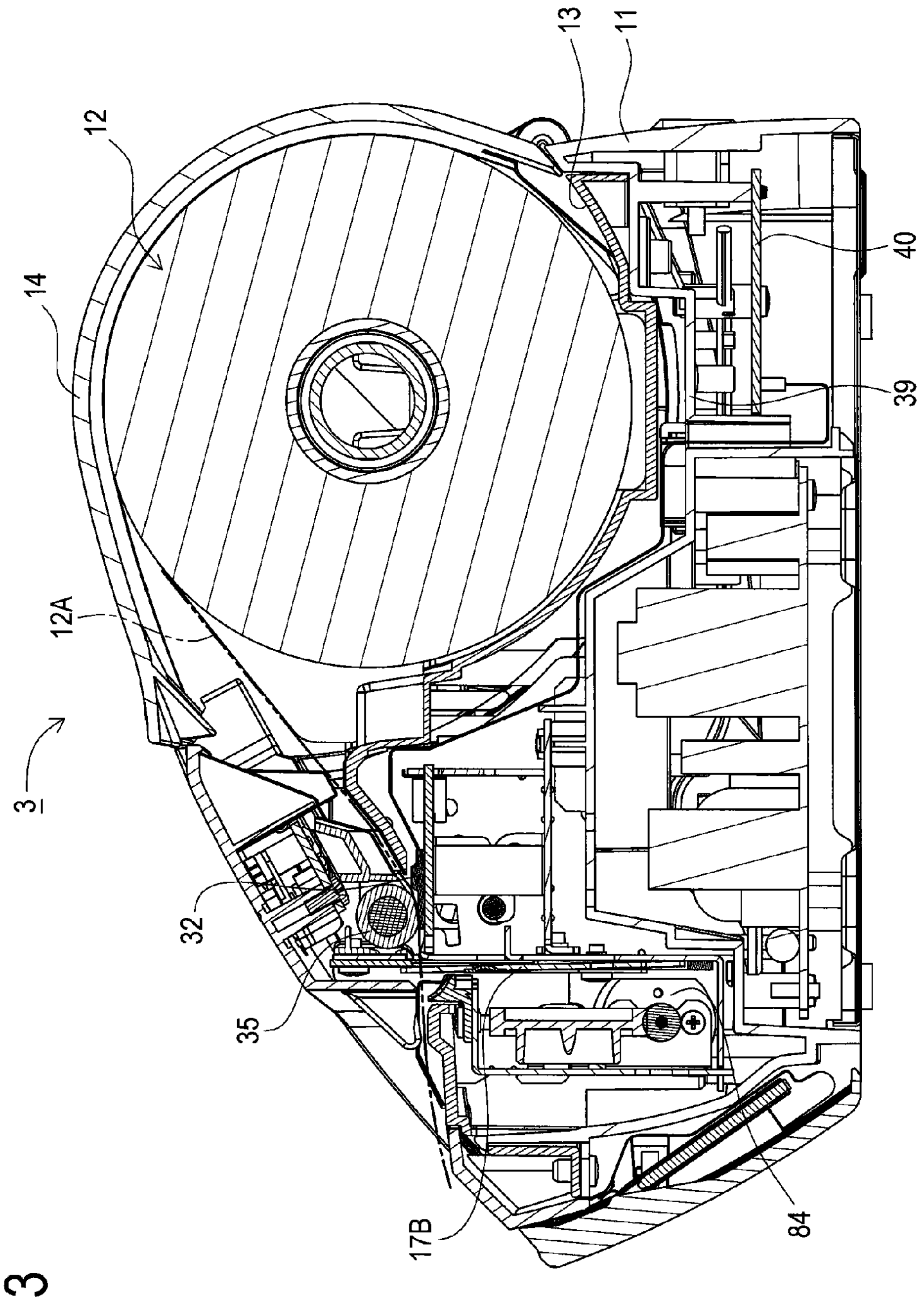
FIG. 3 is a sectional view of the tape printer, with the rolled sheet holder mounted therein.

As shown in FIG. 2 and FIG. 3, a tape printer 3 includes a main body 11 made of resin, a rolled sheet holder 12, a rolled sheet holder housing part 13 and a top cover 14. The rolled sheet holder housing part 13 houses the rolled sheet holder 12 having rolled sheet 12A of a predetermined width wound thereon. The top cover 14 is made of a transparent resin and is formed in a substantially semicircular shape in side view, being fixed to a rear upper edge part of the tape printer 3. The top cover 14 is configured to be freely opened and closed so as to cover the upper side of the rolled sheet holder housing part 13.

Further, below the rolled sheet holder housing part 13, there is provided, through a partition wall 39, a control board 40 on which a control circuit and the like is formed to control driving of mechanisms such as a thermal head 32 in response to commands from the computer 2.

Next, the circuit configuration of the computer 2 which constitutes the badge printing system 1 will be explained while referring to FIG. 4.

Figure 4:
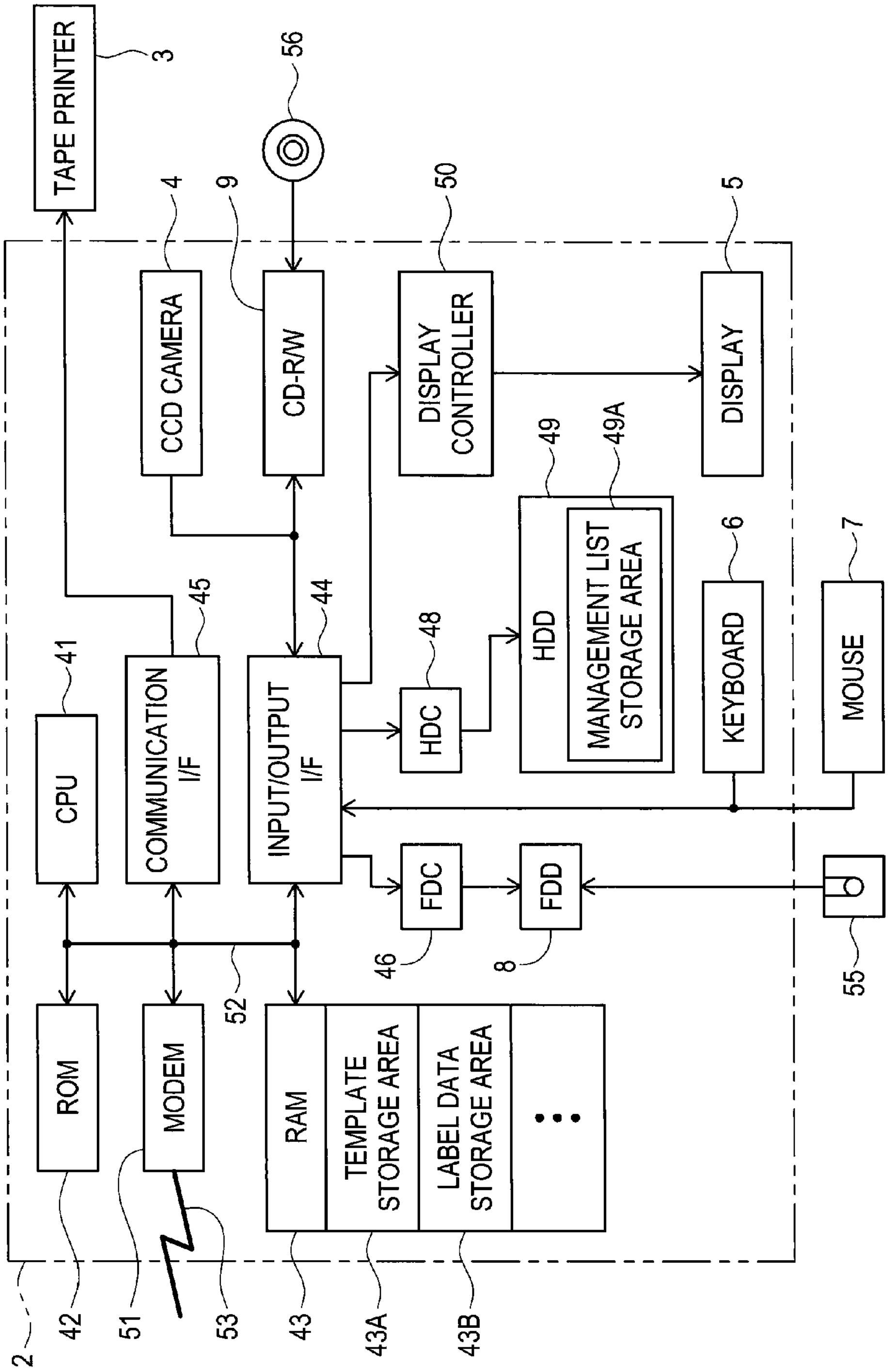
FIG. 4 is a circuit block diagram of a circuit configuration of a main part of the computer as shown in FIG. 1.

As shown in FIG. 4, the computer 2 has a CPU 41, a ROM 42, a RAM 43, an input/output interface (I/F) 44, a communication interface (I/F) 45, a Floppy (trademark) disk controller (FDC) 46, a Floppy (trademark) disk drive (FDD) 8, a hard disk controller (HDC) 48, a hard disk drive (HDD) 49, a display controller 50, a display 5, a keyboard 6, a CCD camera 4, a modem 51 and the like.

The CPU 41, the ROM 42, the RAM 43, the input/output interface (I/F) 44, the communication interface (I/F) 45 and the modem 51 are interconnected through a bus line 52, whereby data is exchanged. To the input/output I/F 44, the FDD 8 is connected through the FDC 46 that controls driving of the FDD 8, and the HDD 49 is connected through the HDC 48 that controls driving of the HDD 49. The display 5 is also connected to the input/output I/F 44 through the display controller 50 that controls driving of the display 5. A telephone line 53 is connected to the modem 51.

Additionally, the CCD camera 4, the keyboard 6, the mouse 7 and the CD-R/W drive 9 are connected to the input/output I/F 44. The CCD camera 4 is used for taking a picture of a visitor. The keyboard 6 is used for entering characters and symbols. The mouse 7 is used for entering the coordinates on the display screen of the display 5. The CD-R/W drive 9 is used for writing and reading into/from a CD-ROM 56 various kinds of application software such as reception management software which performs creating of data for printing a badge or management of visitor to a facility by displaying an input window for inputting personal information and the like of a visitor or an appointment list display window for displaying the list of scheduled visitors (visitors scheduled to enter a facility), as will be described later.

Also, the display 5 is connected to the input/output I/F 44 through the display controller 50. The display 5 displays the input window 91 (see FIG. 7) for inputting personal information and the like of a visitor as will be described later, the appointment list display window 93 (see FIG. 7) for displaying the list of scheduled visitors (visitors scheduled to enter a facility) stored in the appointment list, and the like.

Further, the communication I/F 45 is constituted by a USB (Universal Serial Bus) and the tape printer 3 is connected thereto through a USB connector not shown and the signal cable K1.

The CPU 41 controls the entire badge printing system 1, and manages all data concerning the operation of the badge printing system 1. The ROM 42 stores a startup program for booting the computer 2 to start up the CPU 41 upon being powered on, similarly to general note-book type personal computers.

The RAM 43 temporarily stores different types of data when the CPU 41 performs various kinds of control. The RAM 43 has a template storage area 43A and a label data storage area 43B. The template storage area 43A stores a template used for layout of print data on a badge, i.e., a print area of the rolled sheet 12A. The print data includes a badge ID as an issuance number which represents a print number, a visitor's name, company name, visit date, a photograph of the visitor, the department to visit, the name of contact person and the like. The label data storage area 43B stores label template data to be transmitted to the tape printer 3, and label print data including name and the like of a visitor entered with the keyboard 6.

The HDD 49 also has a management list storage area 49A for storing an appointment list 92 (see FIG. 7), an entry-permitted list (signed-in list) 105 (see FIG. 10) and an exit-permitted list (signed-out list) not shown. The appointment list 92 manages visitors who have visiting appointments. The entry-permitted list (signed-in list) 105 manages the information on visitors who are permitted to enter the facility. The exit-permitted list (signed-out list) manages the record of the visitors who exited from the facility.

Further, various kinds of print data are stored in the Floppy (trademark) disk (FD) 55 which is to be freely inserted in or removed from the FDD 8.

Next, the circuit configuration of the tape printer 3 which constitutes the badge printing system 1 will be explained while referring to FIG. 5.

Figure 5:
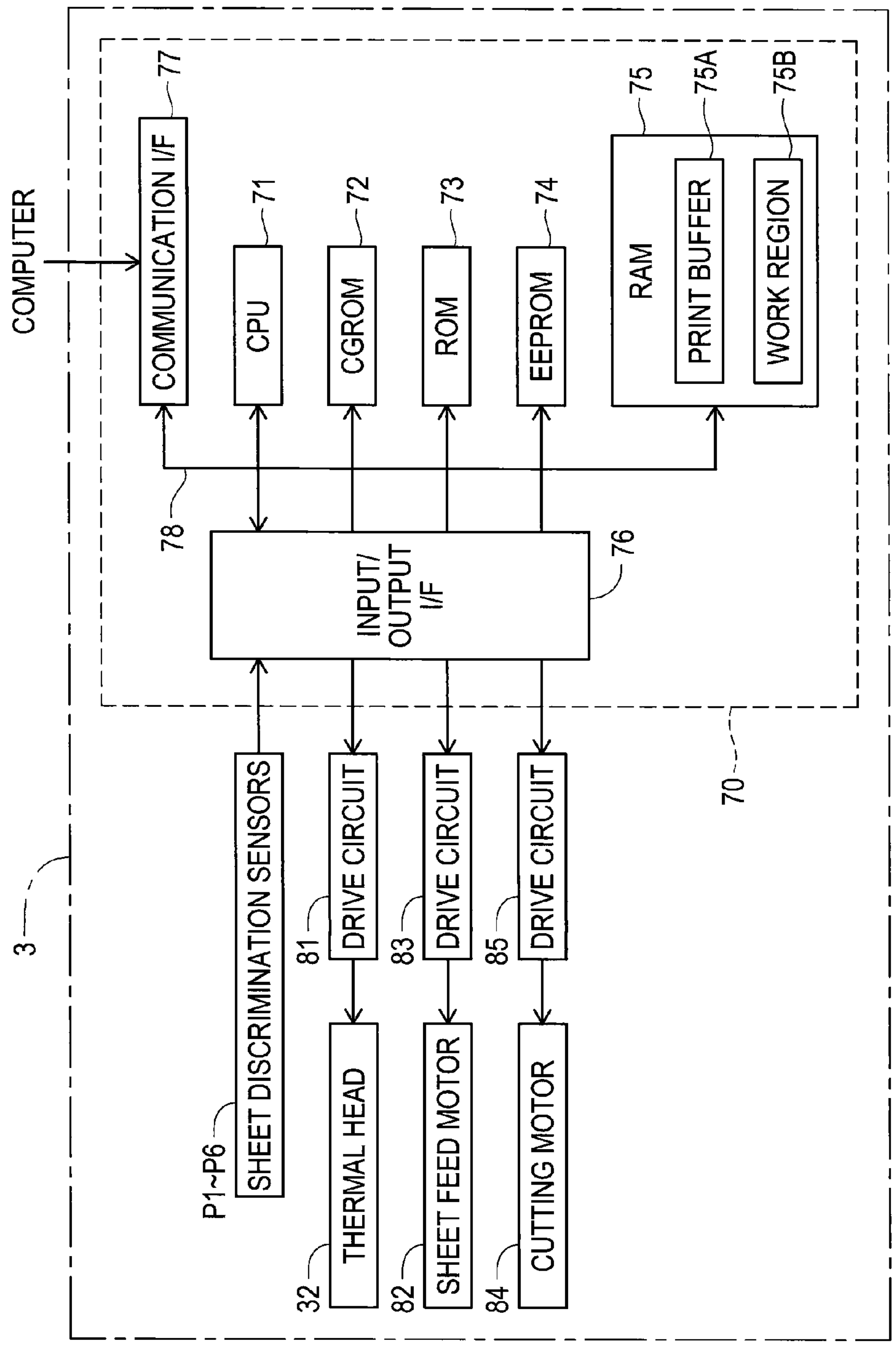
FIG. 5 is a circuit block diagram of a circuit configuration of a main part of the tape printer as shown in FIG. 1.

As shown in FIG. 5, a control circuit 70 formed on the control board 40 of the tape printer 3 has a CPU 71, a CG (character generator) ROM 72, a ROM 73, a flash memory (EEPROM) 74, a RAM 75, an input/output interface (I/F) 76, a communication interface (I/F) 77 and the like. The CPU 71, CGROM 72, ROM 73, flash memory 74, RAM 75, input/output interface (I/F) 76 and the communication interface (I/F) 77 are interconnected through a bus line 78, whereby data is exchanged.

The CGROM 72 stores dot pattern data corresponding to individual characters. The dot pattern data is read out from the CGROM 72 and a dot pattern is printed on the thermal sheet of the rolled sheet 12A based on that dot pattern data.

The ROM 73 stores various types of programs, such as a label creating process program of the non-fixed length rolled sheet 12A, required to control the tape printer 3. The ROM 73 stores the types of rolled sheet 12A and the material of the thermal sheet of the rolled sheet 12A, corresponding to the respective 6-bit codes that were inputted from the sheet discrimination sensors P1 through P6. Further, the ROM 73 stores the dimensions of the die cut label for each die cut.

The CPU 71 serves to execute various operations in accordance with the various programs stored in the ROM 73. The ROM 73 stores outline data related to individual large numbers of characters, such as letters, for defining outlines of the characters. The characters of the outline data are classified into units of a typeface (Gothic typeface, Mincho typeface, or the like) and stored in correlation to code data. The dot pattern data is extracted to a print buffer 75A in accordance with the outline data.

The flash memory 74 serves to store dot pattern data such as extended character data received from an external computer 2 etc. and dot pattern data such as various types of drawing pattern data, which have been allocated registration numbers. The flash memory 74 retains the stored contents even when the power of the tape printer 3 is OFF.

The RAM 75 temporarily stores results of various operations performed by the CPU 71. In the RAM 75 are provided various types of memories such as a print buffer 75A and a work area 75B or the like. The print buffer 75A stores print dot patterns such as a plurality of characters and symbols and the number of applied pulses representing the energy amount for creating the dots, as dot pattern data. The thermal head 32 (see FIG. 3) carries out dot printing in accordance with dot pattern data stored in the print buffer 75A.

The input/output I/F 76 is connected to the sheet discrimination sensors P1 through P6, a drive circuit 81, a drive circuit 83, a drive circuit 85, etc. The drive circuit 81 is used for driving the thermal head 32. The drive circuit 83 is used for driving the sheet feed motor 82 which causes a platen roller 35 (see FIG. 3) to rotate. The drive circuit 85 is used for driving a cutting motor 84 (see FIG. 3) that operates the vertical movement of a movable blade 17B (see FIG. 3).

The communication I/F 77 is connected to the USB connector, and to an external computer 2 through a signal cable K1, allowing interactive data communications therewith. Accordingly, the CPU 71 creates a badge (entry pass) on which the name of visitor, the name of department to visit and the like are printed, based on a print instruction command and print data transmitted from the CPU 41 of the computer 2.

(Reception Management Process)

Next, a reception management process for carrying out an entry/exit management process for managing entry/exit of a visitor to/from a facility and a print control of a scheduled visitor's badge, which is executed by the CPU 41 of the computer 2 in the badge printing system 1 having the above configuration will be described, based on FIG. 6 through FIG. 16.

Figure 6:
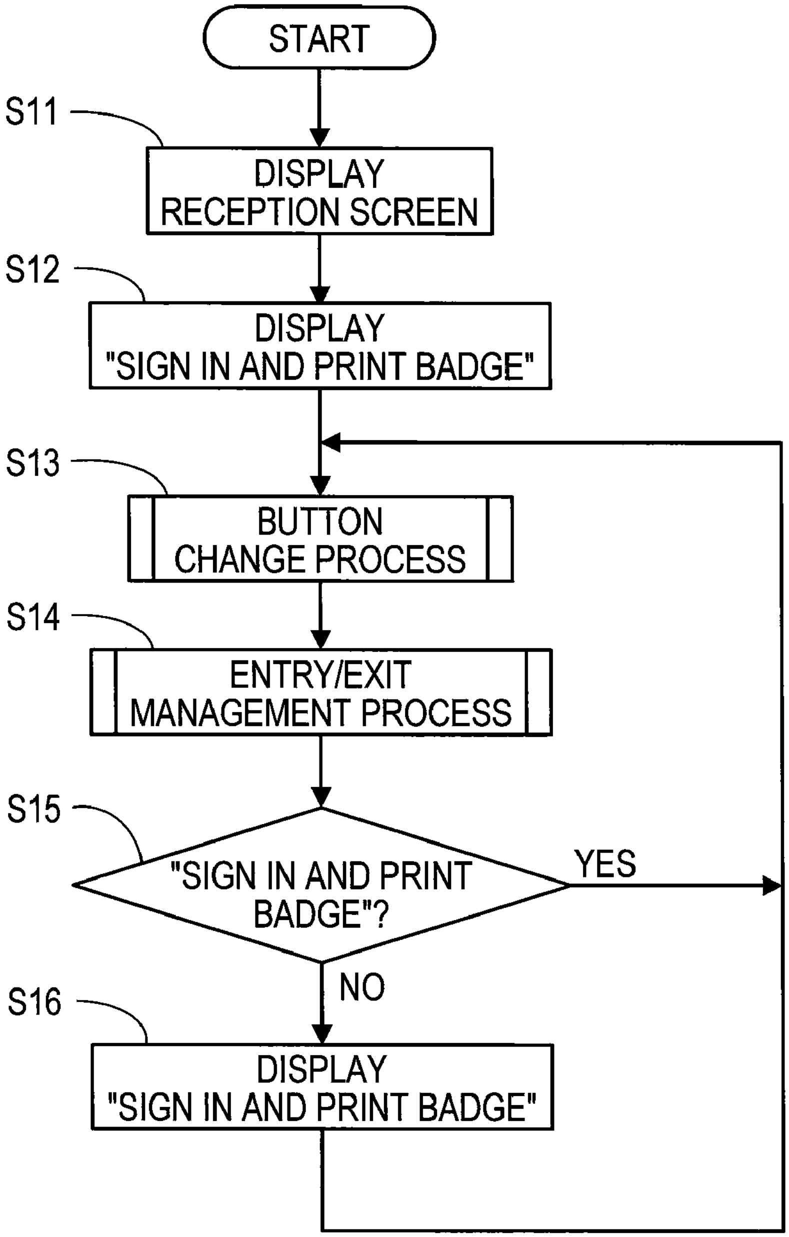
FIG. 6 is a main flowchart of a reception management process for entry/exit management of a visitor into/from a facility and print control of the scheduled visitor's badge, which are carried out by the CPU of the computer.

The program shown as S11 through S16 in the flowchart of FIG. 6 is stored in the HDD 49 or the ROM 42 at the time of factory shipment, and thereby installed in the computer 2. Otherwise, a CD-ROM 56 which records such program is read by the CD-R/W 9, and the read program is loaded onto the HDD 49 and installed in the computer 2. The CPU 41 executes the reception management process when the reception management software is started through the keyboard 6 or the mouse 7.

As shown in FIG. 6, at step (hereinafter referred to as "S") 11, the CPU 41 of the computer 2 displays a reception screen 95 on the display screen of the display 5. The reception screen 95 displays an input window 91 (see FIG. 7) for inputting personal information of a visitor such as a title (for instance, job title), full name, company name, contact person of a department to visit and the like, and an appointment list display window 93 (see FIG. 7) which shows an appointment list (see FIG. 7) of scheduled visitors (visitors scheduled to enter a facility).

Here, one example of the reception screen 95 will be described based on FIG. 7.

Figure 7:
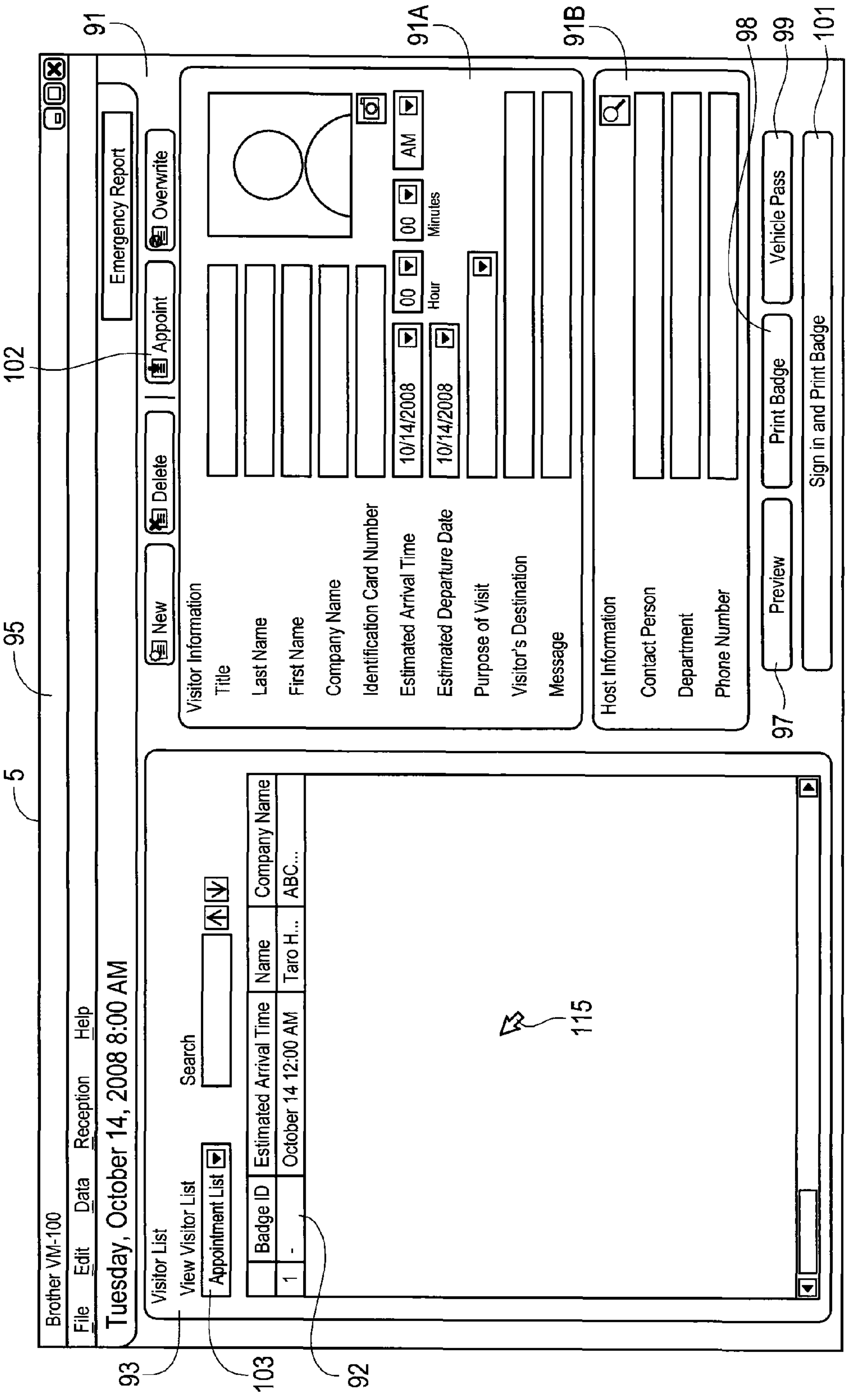
FIG. 7 is a view showing one example of a reception screen.

As shown in FIG. 7, the CPU 41 displays, at the substantial right half portion of the display screen of the display 5, the input window 91 for inputting personal information such as full name, company name and the like of a visitor, purpose of visit, department to visit, name of a contact person and the like. At the substantial left half portion of the display screen of the display 5, the CPU 41 displays the appointment list display window 93 to show the appointment list 92 of scheduled visitors (visitors scheduled to enter a facility), which is stored in the management list storage area 49A of the HDD 49.

The input window 91 also displays a personal information input area 91A and whereunder a host information input area 91B. The personal information input area 91A is used for inputting a photograph of visitor taken by the CCD camera 4, title (such as job title), full name, company name, identification card number of a visitor, estimated arrival time, estimated departure date, purpose of visit, destination, and message. The host information input area 91B is used for inputting a contact person, the contact person's department and contact phone number.

Additionally, below the host information input area 91B, there are displayed a preview button 97, a print-badge button 98, and a print-vehicle-pass button 99, which are each rectangular and long sideways and are aligned in a horizontal direction. Further, a shared button 101 of rectangular and long sideways is displayed below these three buttons 97, 98 and 99, extending throughout the entire width of the three buttons 97, 98 and 99 in a horizontal direction. Above the personal information input area 91A, an appointment button 102 is displayed which is used for instructing to store the inputted information into the appointment list 92.

The appointment list 92 stores scheduled visitor information (information on visitor scheduled to enter a facility) associated with each scheduled visitor. The scheduled visitor information includes badge ID representing issuance number of badge (print number), estimated arrival time, visitor's name, company name, contact person, contact person's department, contact phone number, department to visit, purpose of visit, estimated departure date, message and identification card number. This appointment list 92 is shown in the appointment list display window 93. The data of scheduled visitors of the appointment list 92 are sorted by estimated arrival time.

In the appointment list display window 93, there is arranged a display switch field 103 for instructing to display, instead of the appointment list 92, an entry-permitted list 105 (see FIG. 10) or an exit-permitted list which are stored in the management list storage area 49A of the HDD 49.

Accordingly, by clicking the display switch field 103 with the mouse 7 to select the text "entry-permitted (signed-in)", a user can switch the display to an entry-permitted list display window 106 (see FIG. 10) which shows the entry-permitted list 105. Also, the user can switch the display to a not-shown exit-permitted list display window which shows a not-shown exit-permitted list by clicking the display switch field 103 with the mouse 7 to select the text "exit-permitted (signed-out)".

Then, as shown in FIG. 6, at S12, the CPU 41 displays the text "sign in and print badge" on the shared button 101. Accordingly, the CPU 41 notifies the user that the user can click the shared button 101 with the mouse 7 as will be described later to thereby instruct to create a badge (entry pass) related to the scheduled visitor information (information on visitor scheduled to enter a facility) selected from the appointment list 92 with the mouse 7, and at the same time to store this scheduled visitor information in an entry-permitted list 105. The entry-permitted list 105 holds the scheduled visitor information as entry-permitted visitor information and is stored in the management list storage area 49A.

Next, at S13, the CPU 41 carries out sub-processes of a "button change process" (see FIG. 8) for changing the display of the shared button 101, as will be described later, and the function allocated thereto.

Thereafter, at S14, the CPU 41 carries out sub-processes of an "entry/exit management process" to be described later (see FIG. 12).

Then, at S15, the CPU 41 carries out a judgment process for judging whether or not the text of the shared button 101 is "sign in and print badge". If the text of the shared button 101 is "sign in and print badge" (S15: YES), the CPU 41 carries out the processes following S13 once again.

On the other hand, if the text of the shared button 101 is not "sign in and print badge" (S15: NO), the CPU 41 changes the text of the shared button 101 to "sign in and print badge" and then carries out the processes following S13 once again.

(Button Change Process)

Next, sub-processes of the "button change process" carried out by the CPU 41 at above-described S13 will be described, with reference to FIG. 8 through FIG. 10.

Figure 8:
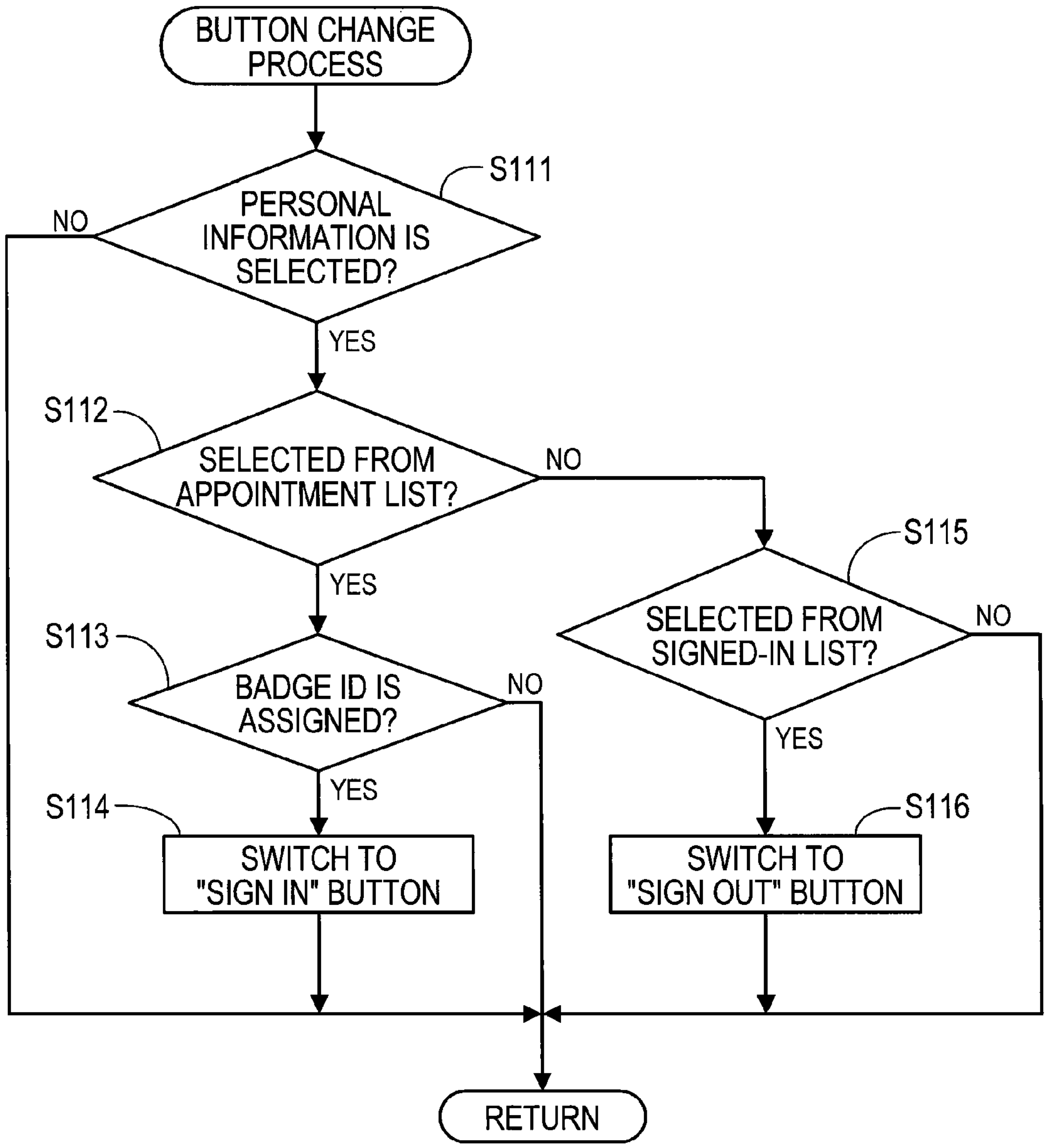
FIG. 8 is a sub-flowchart of sub-processes of the button change process as shown in FIG. 6.

First, at S111 as shown in FIG. 8, the CPU 41 judges whether or not any personal information has been selected from the appointment list 92, entry-permitted list 105 or exit-permitted list displayed in the reception screen 95 by clicking with the mouse 7.

Then, if any personal information in the appointment list 92, entry-permitted list 105 or exit-permitted list displayed in the reception screen 95 is not clicked with the mouse 7, i.e., not selected (S111: NO), the CPU 41 ends the sub-process and shifts the flow to process S14 of the main flowchart.

On the other hand, if any personal information has been selected from the appointment list 92, entry-permitted list 105 or exit-permitted list displayed in the reception screen 95 by clicking with the mouse 7 (S111: YES), the CPU 41 shifts the flow to process S112. At S112, the CPU 41 judges whether or not the personal information has been selected from the appointment list 92 displayed in the reception screen 95 by clicking with the mouse 7.

If the personal information has been selected from the appointment list 92 displayed in the reception screen 95 by clicking with the mouse 7 (S112: YES), the CPU 41 shifts the flow to process S113. At S113, the CPU 41 reads out scheduled visitor information of the visitor scheduled to enter the facility (scheduled visitor), which has been selected from the appointment list 92 by clicking with the mouse 7, and displays the information in the personal information input area 91A and the host information input area 91B of the input window 91. Then, the CPU 41 judges whether or not a "badge ID" representing the issuance number of the badge (print number), specifically, if the "badge ID" displayed in the appointment list 92 is "0".

If the "badge ID" of the read out scheduled visitor information, which represents the issuance number of the badge (print number), is "0" (S113: NO), the CPU 41 judges that a badge ID has not been assigned to the scheduled visitor, i.e., the badge (entry pass) of the scheduled visitor has not been printed. Then, the CPU 41 ends the sub-process and shifts the flow to the process S14 of the main flowchart.

At this time, accordingly, the text of the shared button 101 still shows "sign in and print badge" (see FIG. 7).

On the other hand, if the "badge ID" of the read out scheduled visitor information, which represents the issuance number of the badge (print number) is not "0" (S113: YES), the CPU 41 judged that a badge ID has been assigned to the scheduled visitor, i.e., the badge (entry pass) of the scheduled visitor has been already printed. Then, the CPU 41 shifts the flow to process S114.

At S114, the CPU 41 changes the text of the shared button 101 from "sign in and print badge" to "sign in" which means instructing to store the scheduled visitor information of the scheduled visitor into the entry-permitted list 105. Then, the CPU 41 ends the sub-process and shifts the flow to the process S14 of the main flowchart.

In accordance with the change of the text of the shared button 101 to "sign in", the shared button 101 functions as a "permit-entry button" for instructing to store scheduled visitor information in the entry-permitted list 105.

Here, with reference to FIG. 9, an example will be described in which the text of the shared button 101 is changed from "sign in and print badge" to "sign in".

Figure 9:
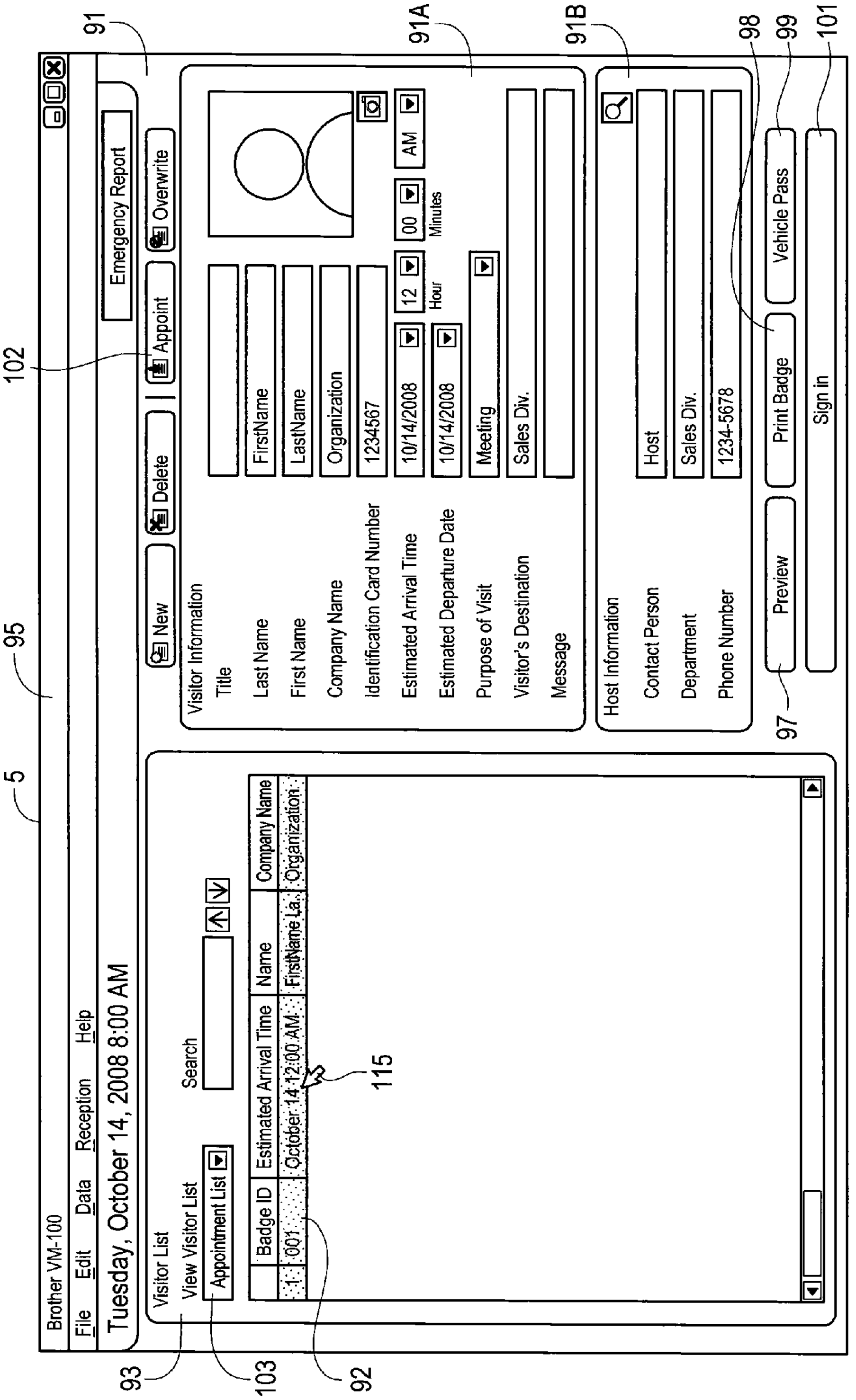
FIG. 9 is a view showing one example of the sate wherein the text of a shared button is changed to "sign in"

As shown in FIG. 9, when a pointer 115 is moved over scheduled visitor information in the appointment list 92 and clicked with the mouse 7, the CPU 41 reads out the scheduled visitor information selected by clicking with the mouse 7 and displays the information in the personal information input area 91A and the host information input area 91B of the input window 91. In this example, the "badge ID" representing the issuance number of the badge (print number) in the appointment list 92 is "001". Thus, it is judged that the badge (entry pass) of the scheduled visitor has been already printed first.

Then, the CPU 41 changes the text of the shared button 101 to "sign in", which means instructing to store the scheduled visitor information of the scheduled visitor into the entry-permitted list 105. Accordingly, by clicking the shared button 101 with the mouse 7, a user can add the scheduled visitor information to the entry-permitted list 105 as entry-permitted visitor information, without printing a badge.

On the other hand, at S112 as shown in FIG. 8, if personal information has not been selected from the appointment list 92 which is displayed in the reception screen 95 (S112: NO), the CPU 41 shifts the flow to process S115. At S115, the CPU 41 judges whether or not personal information in the entry-permitted list (hereinafter referred to as "signed-in list") 105 displayed in the reception screen 95 has been selected by clicking with the mouse 7.

If personal information has not been selected from the signed-in list 105 displayed in the reception screen 95 (S115: NO), the CPU 41 ends the sub-process and shifts the flow back to the process S14 of the main flowchart.

Thus, the text of the shared button 101 still shows "sign in and print badge" (see FIG. 7).

On the other hand, if personal information has been selected from the signed-in list 105 displayed in the reception screen 95 (S115: YES), the CPU 41 shifts the flow to process S116. At S116, the CPU 41 changes the text of the shared button 101 from "sign in and print badge" to "sign out", which means instructing to store the selected personal information into the exit-permitted list. Then, the CPU 41 ends the sub-process and shifts the flow back to the process S14 of the main flowchart.

Here, with reference to FIG. 10, an example will be explained in which the text of the shared button 101 is changed from "sign in and print badge" to "sign out".

The signed-in list 105 is displayed when a user selects "entry-permitted (signed-in)" by clicking the display switch field 103 with the mouse 7. Then, as shown in FIG. 10, when the user moves the pointer 115 over the entry-permitted visitor information and click the mouse 7, the CPU 41 reads out the visitor information selected by clicking with the mouse 7 and displays the information in the personal information input area 91A and the host information input area 91B of the input window 91.

Then, the CPU 41 changes the text of the shared button 101 from "sign in and print badge" to "sign out", which means instructing to store the selected personal information into the exit-permitted list. Accordingly, by clicking the shared button 101 with the mouse 7, the user can add the entry-permitted visitor information to the exit-permitted list as exit-permitted visitor information.

(Entry/Exit Management Process)

Next, sub-processes of the "entry/exit management process" carried out by CPU 41 at the above-described S14 will be described, with reference to FIG. 11 through FIG. 15.

Figure 11:
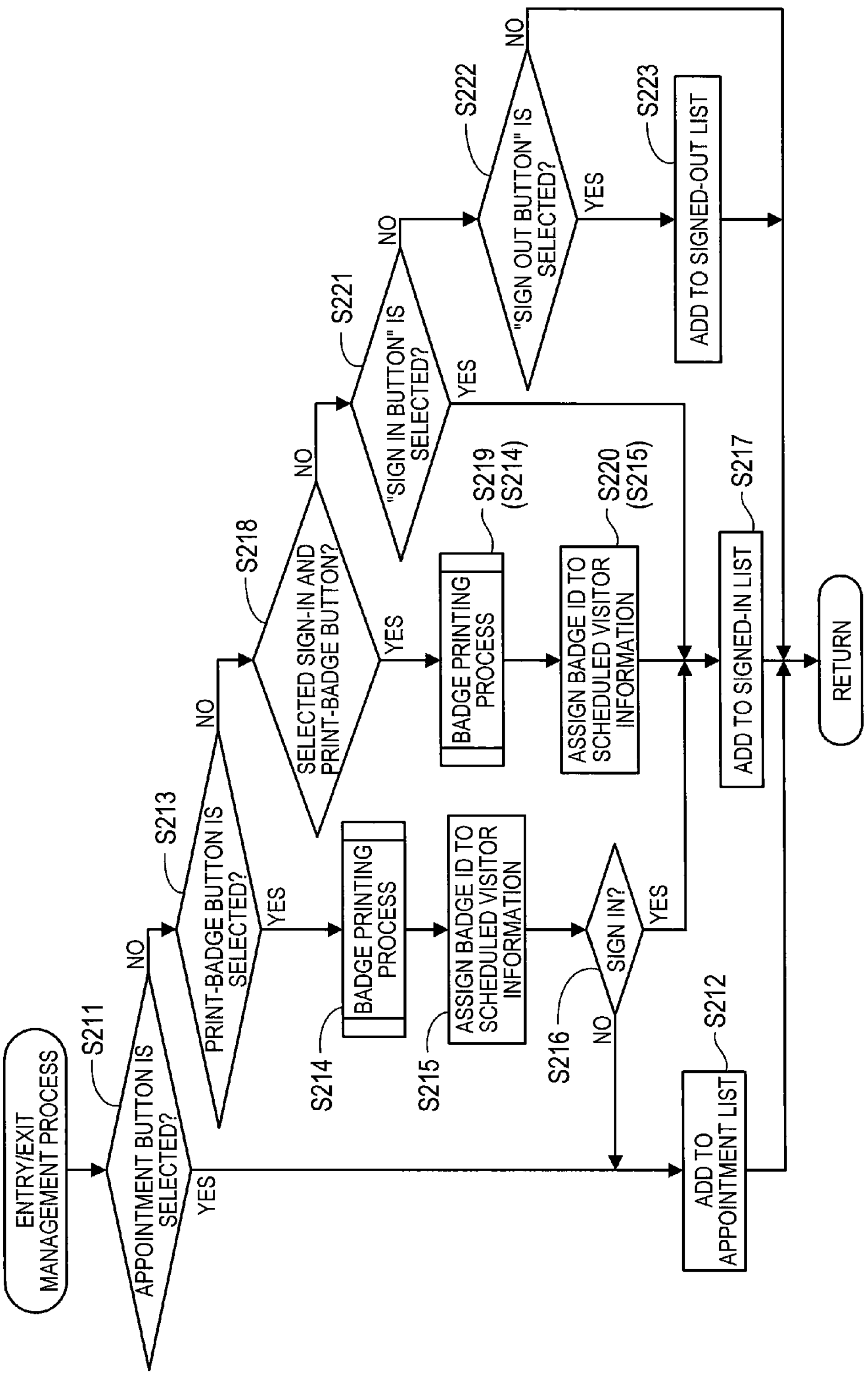
FIG. 11 is a sub-flowchart of sub-processes of the entry/exit management process as shown in FIG. 6.

First, at S211 as shown in FIG. 11, after the pointer 115 is moved over an appointment button 102 displayed in the reception screen 95, the CPU 41 judges whether or not the mouse 7 has been clicked, i.e., the appointment button 102 has been selected.

If the appointment button 102 has been selected (S211: YES), the CPU 41 shifts the flow to process S212.

At S212, the CPU 41 stores information entered in the personal information input area 91A and the host information input area 91B of the input window 91 in the appointment list 92 so as to retain as scheduled visitor information. Then, the CPU 41 ends the sub-process and shifts the flow back to the process of S15 of the main flowchart. It is to be noted that, since a badge (entry pass) is not printed, a badge ID representing the issuance number of the badge (print number) is set to "0" with respect to the scheduled visitor information, which means that a badge ID is not assigned.

Here, an example will be described in which the appointment button 102 has been selected, with reference to FIG. 13.

Figure 13:
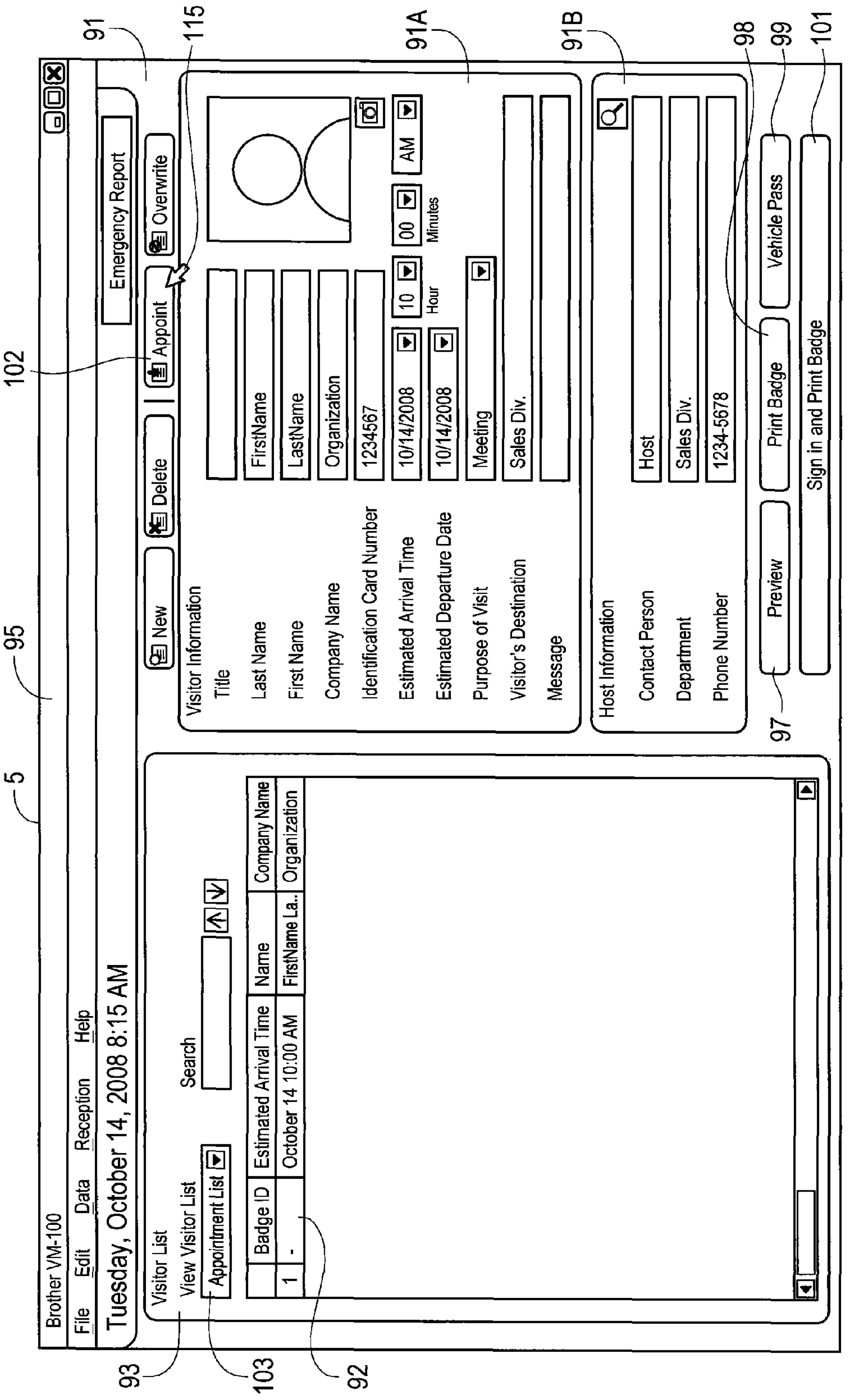
FIG. 13 is a view showing one example of the state wherein an appointment button is clicked with a mouse.

As shown in FIG. 13, a user first inputs, in the personal information input area 91A and the host information input area 91B of the input window 91, visitor's title (such as job title), full name, company name, identification card number, estimated arrival time, estimated departure date, purpose of visit, destination, message, contact person, contact person's department and telephone number of the department. Then, the user moves the pointer 115 over the appointment button 102 and clicks the mouse 7.

Thereafter, the CPU 41 retains the information entered in the personal information input area 91A and the host information input area 91B of the input window 91 as scheduled visitor information, by storing the information into the appointment list 92 in the management list storage area 49A. Then, the CPU 41 reads out this appointment list 92 from the management list storage area 49A and displays in the appointment list display window 93. It is to be noted, since a badge (entry pass) has not been printed, the CPU 41 displays the letter "-" in the badge ID of the scheduled visitor information in the appointment list 92 to be displayed in the appointment list display window 93. The letter "-" represents that the badge ID has not been assigned to the scheduled visitor information.

On the other hand, as shown in FIG. 11, if the appointment button 102 has not been selected (S211: NO), the CPU 41 shifts the flow to process S213. At 5213, after the pointer 115 has been moved over the print-badge button 98 displayed in the reception screen 95, the CPU 41 judges whether or not the mouse 7 has been clicked, i.e., the print-badge button 98 has been selected or not.

If the print-badge button 98 has been selected (S213: YES), the CPU 41 shifts the flow to process S214. At S214, the CPU 41 carries out sub-processes of the "badge printing process" (see FIG. 12) and then shifts the flow to process S215.

Here, the sub-processes of the "badge printing process" will be described with reference to FIG. 12.

Figure 12:
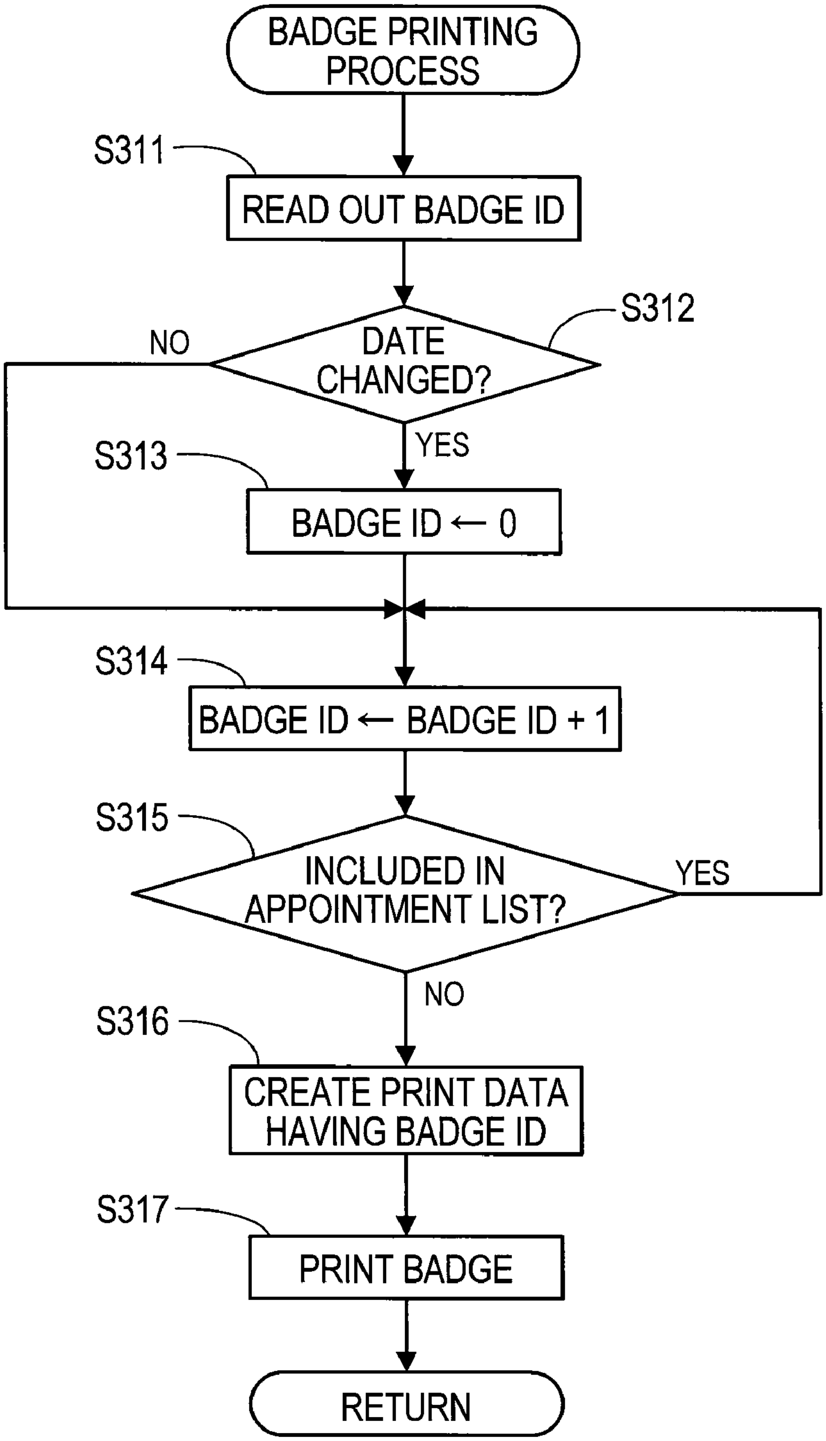
FIG. 12 is a sub-flowchart of sub-processes of the badge printing process as shown in FIG. 11.

First, at 311 as shown in FIG. 12, the CPU 41 reads out a "badge ID" from the RAM 43 which is used as a count value for counting the number of issued badges (entry passes).

Next, at S312, the CPU 41 reads out time information from a not-shown timer and judges whether or not the date has been changed. It is to be noted that the computer 2 has a built-in timer for keeping time, which is not shown.

If the date has not been changed (S312: NO), the CPU 41 shifts the flow to process S314 to be described later.

On the other hand, if the date has been changed (S312: YES), the CPU 41 shifts the flow to process S313. At S313, the CPU 41 assigns "0" to the "badge ID" read from the RAM 43 and stores in the RAM 43.

Next, at S314, the CPU 41 reads out the "badge ID" from the RAM 43, adding "1" to this "badge ID" to store in the RAM 43 once again.

Subsequently, at S315, the CPU 41 reads out the "badge ID" from the RAM 43, and thereafter judges whether this badge ID matches any of "badge ID" of the scheduled visitor information in the appointment list 92 stored in the management list storage area 49A. In other words, the CPU 41 judges whether the "badge ID" read out from the RAM 43 exists in the appointment list 92.

Then, if the "badge ID" read out from the RAM 43 exists in the appointment list 92 (S315: YES), the CPU 41 carries out the processes following the process S314 once again.

If the "badge ID" read out from the RAM 43 does not exist in the appointment list 92 (S315: NO), the CPU 41 shifts the flow to process S316.

At S316, if the personal information in the appointment list 92 shown in the appointment list display window 93 has not been selected with the mouse 7, the CPU 41 assigns thus-obtained "badge ID" to the information entered in the personal information input area 91A and host information input area 91B of the input window 91, thereby creating label print data for scheduled visitor information and storing into the RAM 43. On the other hand, if the personal information in the appointment list 92 shown in the appointment list display window 93 has been selected with the mouse 7, the CPU 41 assigns thus-obtained "badge ID" to the selected personal information in the appointment list 92, thereby creating label print data for the scheduled visitor information and storing into the RAM 43.

More specifically, the CPU 41 reads out, from the template storage area 43A, the template selected by the user in advance. According to this template, the CPU 41 arranges, in a print area, the respective personal information entered in the personal information input area 91A and the host information input area 91B of the reception screen 95 or the selected personal information in the appointment list 92, and the "badge ID" read out from the RAM 43. In this manner, the CPU 41 creates label print data and stores into label data storage area 43B.

Next, at S317, the CPU 41 reads out the label print data from the label data storage area 43B and then transmits this information, together with a print instruction command, to the tape printer 3 via the communication I/F 45. The information and the print instruction command transmitted are used as badge print data. Thereafter, the CPU 41 ends the sub-process and shifts the flow back to the sub-process of "entry/exit management process". Accordingly, it is possible to create a badge having a "badge ID" representing an issuance number (print order) printed thereon.

Here, an example of a badge (entry pass) having a visitor's name, the name of department to visit and the like printed thereon will be explained with reference to FIG. 14.

Figure 14:
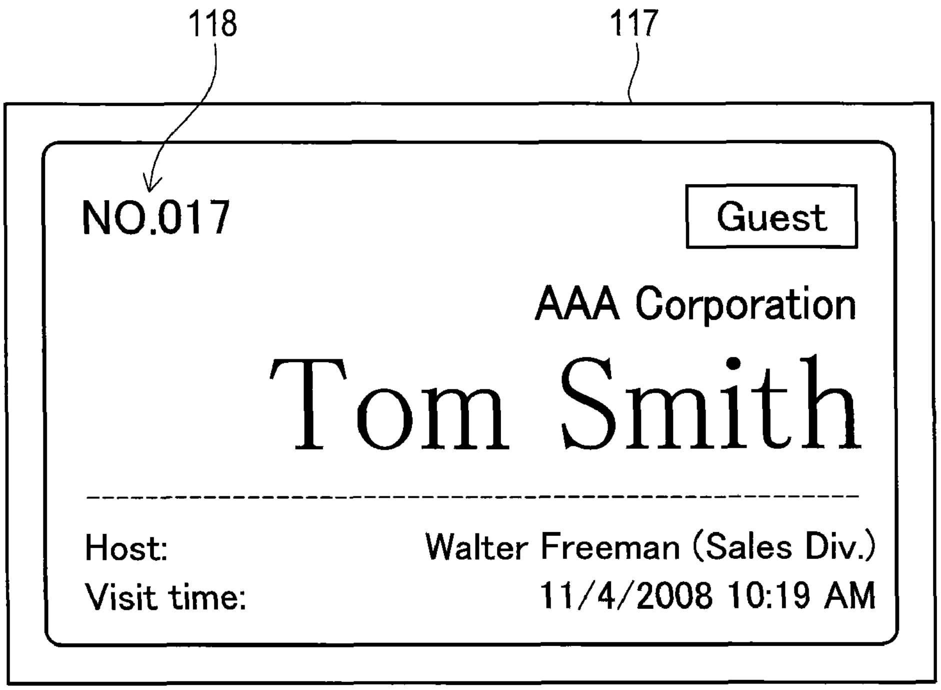
FIG. 14 is a view showing one example of a printed badge.

As shown in FIG. 14, a badge (entry pass) 117 has, at the left upper corner thereof, a badge ID 118 of "No. 017" printed thereon which represents an issuance number (print number). Also, the badge (entry pass) 117 has, at its center, the visitor's name "Tom Smith" and the company name "AAA Corporation" printed thereon.

At the lower portion of the badge (entry pass) 117, there are printed the name of contact person "Walter Freeman" and the name of the contact person's department "(Sales Div.)" which means the contact person belongs to sales department. Further, at the lower portion thereof, there is printed the scheduled visit time "Nov. 4, 2008 10:19 AM".

It is to be noted that the CPU 41 may obtain an actual visit time from the timer and create badge print data which include the visit time, instead of estimated arrival date and then transmit this badge print data together with print instruction command to the tape printer 3 via the communication I/F 45. This makes it possible to print the actual visit time on the badge (entry pass) 117.

As shown in FIG. 11, at S215, the CPU 41 reads out the "badge ID" from the RAM 43. This "badge ID" serves to represent the print number of the badge (entry pass). The CPU 41 then assigns this "badge ID" to the personal information entered in the personal information input area 91A and the host information input area 91B of the reception screen 95 so as to create scheduled visitor information and store into the RAM 43.

Next, at S216, the CPU 41 displays an entry-permission confirmation window 121 (see FIG. 15) and thereafter judges whether or not an entry to a facility is permitted regarding a scheduled visitor which corresponds to the scheduled visitor information.

Figure 15:
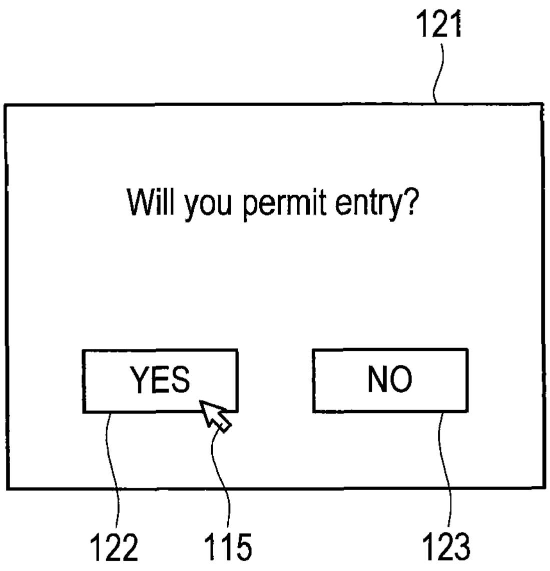
FIG. 15 is a view showing one example of an entry-permission confirmation window 121.

For instance, the CPU 41 displays the entry-permission confirmation window 121 as shown in FIG. 15 substantially at the center of the display screen of the display 5. In this example, the entry-permission confirmation window 121 shows the message "Will you permit entry?", and a YES button 122 and a NO button 123 at the downside of the message. After the pointer 115 is moved over the YES button 122 of the entry-permission confirmation window 121, the CPU 41 judges whether or not the mouse 7 has been clicked.

If it is judged that an entry to the facility is not permitted regarding the scheduled visitor which corresponds to the scheduled visitor information (S216: NO), the CPU 41 shifts the flow to process S212.

For instance, the CPU 41 shifts the flow to the process S212 if the mouse 7 has been clicked after the pointer 115 is moved over the NO button 123 in the entry-permission confirmation window 121 as shown in FIG. 15.

At S212, the CPU 41 stores the scheduled visitor information having the badge ID assigned thereto in the appointment list 92. Thereafter, the CPU 41 ends the sub-process and shifts the flow back to the process S15 of the main flowchart. As a result, the badge ID printed on the badge (entry pass) is shown in the scheduled visitor information in the appointment list 92 being displayed in the appointment list display window 93.

On the other hand, if it is judged that an entry to the facility is permitted regarding the scheduled visitor which corresponds to the scheduled visitor information, that is, if it is judged that the printed badge (entry pass) has been given to the scheduled visitor (S216: YES), the CPU 41 shifts the flow to process S217.

For instance, the CPU 41 shifts the flow to the process S217 if the mouse 7 has been clicked after the pointer 115 is moved over the YES button 122 in the entry-permission confirmation window 121 as shown in FIG. 15.

At S217, the CPU 41 stores the scheduled visitor information having the badge ID assigned thereto in the signed-in list 105. Thereafter, the CPU 41 ends the sub-process and shifts the flow back to the process S15 of the main flowchart.

Figure 10:
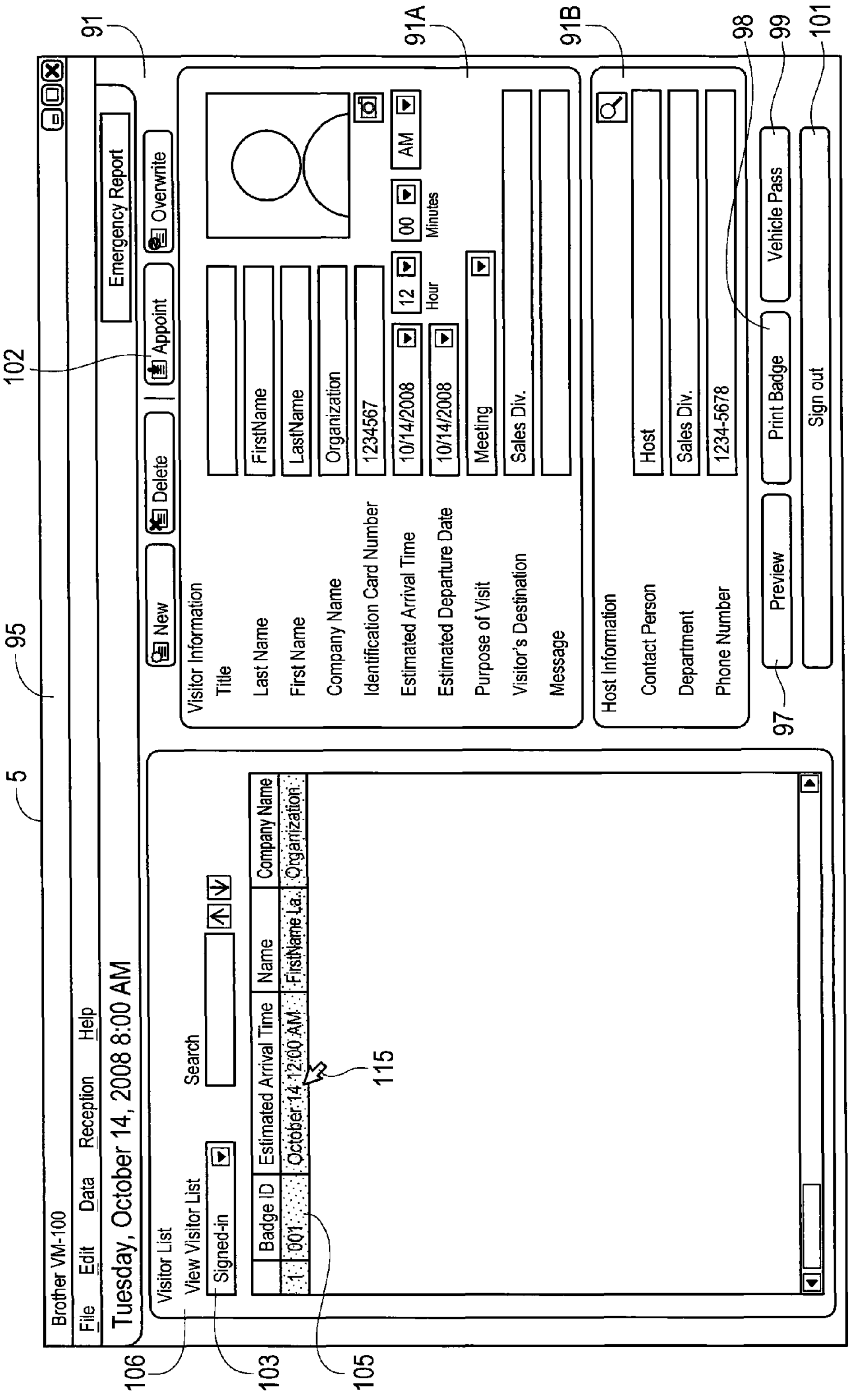
FIG. 10 is a view showing one example of the state wherein the text of the shared button is changed to "sign out"

As a result, the badge ID printed on the badge (entry pass) is shown in the scheduled visitor information in the entry-permitted list 105 being displayed in the entry-permitted list display window 106 (see FIG. 10).

On the other hand, at 5213 as described above, if the print-badge button 98 has not been selected (S213: NO), the CPU 41 shifts the flow to process S218. At S218, after the pointer 115 is moved over the shared button 101 of which button text is "sign in and print badge", the CPU 41 judges whether or not the mouse 7 has been clicked. In other words, the CPU 41 judges if the shared button 101 showing "sign in and print badge" has been selected.

For instance, the CPU 41 judges if the mouse 7 has been clicked after the pointer 115 is moved over the shared button 101 of which button text is "sign in and print badge", while the reception screen 95 as shown in FIG. 13 is displayed on the display 5. In other words, the CPU 41 judges if the shared button 101 showing "sign in and print badge" has been selected.

Then, if it is judged that the shared button 101 showing "sign in and print badge" has been selected (S218: YES), the CPU 41 shifts the flow to process S219 and carries out the process S214 as described above. Thereafter, at S220, the CPU 41 carries out the process S215 as described above. Then, the CPU 41 judges that an entry to the facility has been permitted regarding the visitor corresponding to the scheduled visitor information. In other words, the CPU 41 judges that the printed badge (entry pass) has been given to the scheduled visitor and carries out the process S217 as described above. Thereafter, the CPU 41 ends the sub-process and shifts the flow back to the process S15 of the main flowchart.

As a result, the badge ID printed on the badge (entry pass) is shown in the scheduled visitor information in the entry-permitted list 105 displayed in the entry-permitted list display window 106 (see FIG. 10). This means that the printed badge (entry pass) has been already given to the scheduled visitor.

On the other hand, if it is judged that the shared button 101 showing "sign in and print badge" has not been selected (S218: NO), the CPU 41 shifts the flow to process S221. At S221, the CPU 41 judges whether or not the mouse 7 has been clicked after the pointer 115 is moved over the shared button 101 showing "sign in". In other words, the CPU 41 judges whether or not the shared button 101 showing "sign in" has been selected.

For instance, the CPU 41 judges if the mouse 7 has been clicked after the pointer 115 is moved over the shared button 101 of which button text is "sign in", while the reception screen 95 as shown in FIG. 9 is displayed on the display 5. In other words, the CPU 41 judges if the shared button 101 showing "sign in" has been selected.

Then, if it is judged that the shared button 101 showing "sign in" has been selected (S221: YES), the CPU 41 judges that an entry to the facility has been permitted regarding the visitor. In other words, the CPU 41 judges that the printed badge (entry pass) has been given to the scheduled visitor and carries out the process S217 as described above. Thereafter, the CPU 41 ends the sub-process and shifts the process back to the process S15 of the main flowchart.

On the other hand, if it is judged that the shared button 101 showing "sign in" has not been selected (S221: NO), the CPU 41 shifts the flow to process S222. At S222, the CPU 41 judges whether or not the mouse 7 has been clicked after the pointer 115 is moved over the shared button 101 of which button text is "sign out". In other words, the CPU 41 judges whether or not the shared button 101 showing "sign out" has been selected.

For instance, the CPU 41 judges if the mouse 7 has been clicked after the pointer 115 is moved over the shared button 101 of which button text is "sign out", while the reception screen 95 as shown in FIG. 10 is displayed on the display 5. In other words, the CPU 41 judges if the shared button 101 showing "sign out" has been selected.

Then, if it is judged that the shared button 101 showing "sign out" has been selected (S222: YES), the CPU 41 shifts the flow to process S223. At S223, the CPU 41 deletes, from the signed-in list 105, the entry-permitted visitor information selected from the signed-in list 105 shown in the entry-permitted list display window 106 and stores this entry-permitted visitor information as exit-permitted visitor information in exit-permitted list (signed-out list). Thereafter, the CPU 41 ends the sub-process and shifts the flow back to the process S15 of the main flowchart.

On the other hand, if it is judged that the shared button 101 showing "sign out" has not been selected (S222: NO), the CPU 41 ends the sub-process and shifts the flow back to the process S15 of the main flowchart.

As described above in detail, in the badge printing system 1 according to the present embodiment, when the appointment button 102 is selected with the mouse 7, the CPU 41 of the computer 2 makes up scheduled visitor information from the respective information entered in the personal information input area 91A and the host information input area 91B displayed in the input window 91, and stores the information in the appointment list 92.

When the print-badge button 98 has been selected with the mouse 7, the CPU 41 assigns a "badge ID" to the information entered in the personal information input area 91A and the host information input area 91B in the input window 91, or to the personal information selected from the appointment list 92, whereby the CPU 41 creates label print data of scheduled visitor information and transmit it together with print instruction command to the tape printer 3. When it is judged that an entry to the facility has not been permitted regarding the scheduled visitor of which badge had been printed through the entry-permission confirmation window 121, the CPU 41 stores the scheduled visitor information having the badge ID assigned thereto in the appointment list 92.

Owing to this, a reception management staff selects a scheduled visitor from the appointment list 92 displayed in the appointment list display window 93 and thereafter selecting the print-badge button 98 with the mouse 7, to thereby print a badge (entry pass) having thereon a badge ID representing the issuance number (print number) in advance. Also, since the badge ID is printed on the badge (entry pass), the reception management staff can promptly find the badge (entry pass) and give it to the visitor by seeing the badge ID printed on the badge (entry pass).

Further, when the scheduled visitor information having a badge ID assigned thereto has been selected with the mouse 7 from the appointment list 92, which is displayed in the appointment list display window 93, the CPU 41 changes the text of the shared button 101 from “sign in and print badge” to “sign in” which means instructing to store the scheduled visitor information in the signed-in list 105.

Accordingly, the reception management staff can easily judge whether a badge (entry pass) has been already printed for the visitor, by checking if the badge ID is assigned to the scheduled visitor information selected from the appointment list 92 displayed in the appointment list display window 93. Further, if the badge (entry pass) of the visitor has been already printed, the reception management staff can promptly give the already-printed badge (entry pass) to the scheduled visitor by clicking the shared button 101 showing “sign in” with the mouse 7 so as to add the information to the signed-in list 105. At the same time, it is possible to assuredly prevent printing of the same badge (entry pass) redundantly.

Further, in a case where the pointer 115 is moved over the shared button 101 showing “sign in and print badge” and thereafter the mouse 7 is clicked, the CPU 41 creates label print data with respect to the scheduled visitor information by assigning the “badge ID” to the information entered in the personal information input area 91A and the host information input area 91B or to the personal information selected from the appointment list 92 displayed in the reception screen 95. Then, the CPU 41 reads this label print data and transmits it together with a print instruction command as badge print data to the tape printer 3 via the communication I/F 45. Further, the CPU 41 stores the scheduled visitor information having the badge ID assigned thereto in the signed-in list 105.

In this manner, the reception management staff selects the scheduled visitor information from the appointment list 92 displayed in the appointment list display window 93 and operates the shared button 101 showing “sign in and print badge” with the mouse 7. Accordingly, the reception management staff can print a badge (entry pass) having a badge ID printed thereon and add the personal information of the scheduled visitor to the signed-in list 105, which is to be used as entry-permitted visitor information. Consequently, by operating the shared button 101 showing “sign in and print badge” with the mouse 7, the reception management staff can conduct printing of a badge (entry pass) for a scheduled visitor and entry of the personal information of the scheduled visitor in the signed-in list 105 simultaneously.

While the presently exemplary embodiment has been shown and described, it is to be understood that this disclosure is for the purpose of illustration and that various changes and modifications may be made without departing from the scope of the disclosure as set forth in the appended claims.

What is claimed is:

1. A reception management apparatus comprising:

a print data output unit that outputs, to a printer, print data of an entry pass which permits entry to a facility;

a personal information input device through which personal information for identifying a scheduled visitor to the facility is inputted;

an entry appointment storage unit that stores, in an appointment list, the personal information inputted through the personal information input device as scheduled visitor information with respect to the scheduled visitor to the facility;

a window display device that displays, in a display screen, an input window which is used in inputting the personal information and an appointment list display window which shows by list the scheduled visitor information stored in the appointment list;

a scheduled visitor information select device that is used in selecting one scheduled visitor information from among the scheduled visitor information shown in the appointment list display window;

a button arrangement unit that arranges, in the display screen, a print button which is used in inputting a print instruction and a shared button which is used in simultaneously inputting the print instruction and a storage instruction to an entry-permitted list;

an input device that is used in carrying out an input operation;

a badge ID display control unit that, in a case where the print button is operated using the input device after the scheduled visitor information is selected using the scheduled visitor information select device, assigns a badge ID representing print number to the scheduled visitor information selected using the scheduled visitor information select device to thereby create the print data of the entry pass associated with the scheduled visitor information and output to the printer, and simultaneously displays the badge ID assigned in the scheduled visitor information displayed in the appointment list display window; and a shared button control unit that, in a case where the shared button is operated using the input device after the scheduled visitor information is selected using the scheduled visitor information select device, assigns the badge ID representing print number to the scheduled visitor information selected using the scheduled visitor information select device to thereby create the print data of the entry pass associated with the scheduled visitor information and output to the printer, and simultaneously stores, in the entry-permitted list, the personal information corresponding to the scheduled visitor information as entry-permitted visitor information with respect to an entry-permitted visitor to the facility.

2. The reception management apparatus according to claim 1, further comprising:

an ID judgment unit that, in a case where the scheduled visitor information is selected using the scheduled visitor information select device, judges whether or not the badge ID is assigned to the scheduled visitor information;

a shared button switching unit that, in a case where it is judged that the badge ID is assigned to the scheduled visitor information selected using the scheduled visitor information select device, arranges, in the display screen, a permit-entry button that is used in instructing to store the personal information corresponding to the scheduled visitor information as the entry-permitted visitor information in the entry-permitted list, instead of the shared button; and an entry permission control unit that, in a case where the permit-entry button is operated using the input device, stores the personal information corresponding to the scheduled visitor information as the entry-permitted visitor information in the entry-permitted list.

3. The reception management apparatus according to claim 1, wherein the print data of the entry pass includes badge ID print data for printing the badge ID assigned to the scheduled visitor information.

4. A reception management method comprising:

a personal information input step of inputting personal information for identifying a scheduled visitor to a facility;

an entry appointment storage step of storing, in an appointment list, the personal information inputted in the personal information input step as scheduled visitor information with respect to the scheduled visitor to the facility;

a window display step of displaying, in a display screen, an appointment list display window which shows by list the scheduled visitor information stored in the appointment list;

a scheduled visitor information select step of selecting one scheduled visitor information from among the scheduled visitor information shown in the appointment list display window in the window display step;

a button arrangement step of arranging, in the display screen, a print button which is used in inputting a print instruction and a shared button which is used in simultaneously inputting the print instruction and a storage instruction to an entry-permitted list;

a badge ID display control step of, in a case where the print button is operated using an input device that is used in carrying out an input operation after the scheduled visitor information is selected in the scheduled visitor information select step, assigning a badge ID representing print number to the scheduled visitor information selected in the scheduled visitor information select step to thereby create print data of an entry pass associated with the scheduled visitor information and output to the printer, and simultaneously displays the badge ID assigned in the scheduled visitor information displayed in the appointment list display window; and a shared button control step of, in a case where the shared button is operated using the input device after the scheduled visitor information is selected in the scheduled visitor information select step, assigning the badge ID representing print number to the scheduled visitor information selected in the scheduled visitor information select step to thereby create the print data of the entry pass associated with the scheduled visitor information and output to the printer, and simultaneously storing, in the entry-permitted list, the personal information corresponding to the scheduled visitor information as entry-permitted visitor information with respect to an entry-permitted visitor to the facility.

5. The reception management method according to claim 4, further comprising:

an ID judgment step of, in a case where the scheduled visitor information is selected in the scheduled visitor information select step, judging whether or not the badge ID is assigned to the scheduled visitor information;

a shared button switching step of, in a case where it is judged that the badge ID is assigned to the scheduled visitor information selected in the ID judgment step, arranging, in the display screen, a permit-entry button that is used in instructing to store the personal information corresponding to the scheduled visitor information as the entry-permitted visitor information in the entry-permitted list, instead of the shared button;

an operation judgment step of judging whether or not the permit-entry button is operated using the input device; and an entry permission control step of, in a case where it is judged that the permit-entry button is operated using the input device, storing the personal information corresponding to the scheduled visitor information as the entry-permitted visitor information in the entry-permitted list.

6. The reception management method according to claim 4, wherein the print data of the entry pass includes badge ID print data for printing the badge ID assigned to the scheduled visitor information.

7. A non-transitory computer program product used and executed by a reception management apparatus comprising: a computer readable recording medium; and a computer program stored in the computer readable recording medium, wherein the computer program includes: a personal information input step of inputting personal information for identifying a scheduled visitor to a facility; an entry appointment storage step of storing, in an appointment list, the personal information inputted in the personal information input step as scheduled visitor information with respect to the scheduled visitor to the facility; a window display step of displaying, in a display screen, an input window which is used in inputting the personal information and an appointment list display window which shows by list the scheduled visitor information stored in the appointment list; a scheduled visitor information select step of selecting one scheduled visitor information from among the scheduled visitor information shown in the appointment list display window in the window display step;

a button arrangement step of arranging, in the display screen, a print button which is used in inputting a print instruction and a shared button which is used in simultaneously inputting the print instruction and a storage instruction to an entry-permitted list; a badge ID display control step of, in a case where the print button is operated using an input device that is used in carrying out an input operation after the scheduled visitor information is selected in the scheduled visitor information select step, assigning a badge ID representing print number to the scheduled visitor information selected in the scheduled visitor information select step to thereby create print data of an entry pass associated with the scheduled visitor information and output to the printer, and simultaneously displays the badge ID assigned in the scheduled visitor information displayed in the appointment list display window; and a shared button control step of, in a case where the shared button is operated using the input device after the scheduled visitor information is selected in the scheduled visitor information select step, assigning the badge ID representing print number to the scheduled visitor information selected in the scheduled visitor information select step to thereby create the print data of the entry pass associated with the scheduled visitor information and output to the printer, and simultaneously storing, in the entry-permitted list, the personal information corresponding to the scheduled visitor information as entry-permitted visitor information with respect to an entry-permitted visitor to the facility.

8. The non-transitory computer program product according to claim 7, wherein the computer program includes: an ID judgment step of, in a case where the scheduled visitor information is selected in the scheduled visitor information select step, judging whether or not the badge ID is assigned to the scheduled visitor information; a shared button switching step of, in a case where it is judged that the badge ID is assigned to the scheduled visitor information selected in the scheduled visitor information select step, arranging, in the display screen, a permit-entry button that is used in instructing to store the personal information corresponding to the scheduled visitor information as the entry-permitted visitor information in the entry-permitted list, instead of the shared button; an operation judgment step of judging whether or not the permit-entry button is operated using the input device; and an entry permission control step of, in a case where it is judged that the permit-entry button is operated using the input device, storing the personal information corresponding to the scheduled visitor information as the entry-permitted visitor information in the entry-permitted list.

9. The non-transitory computer program product according to claim 7, wherein the print data of the entry pass includes badge ID print data for printing the badge ID assigned to the scheduled visitor information.

* * * * *